Jan. 28, 1947.  G. A. LYON  2,414,824
WHEEL STRUCTURE
Filed April 5, 1943

Inventor
GEORGE ALBERT LYON.
by Charles W Hills
Attys.

Patented Jan. 28, 1947

2,414,824

UNITED STATES PATENT OFFICE 2,414,824

WHEEL STRUCTURE

George Albert Lyon, Allenhurst, N. J.

Application April 5, 1943, Serial No. 481,805

3 Claims. (Cl. 301—37)

This invention relates to an improved wheel structure and is directed more particularly to an improved cover assembly therefor.

It is an important object of the present invention to provide for a wheel structure, a multi-part cover assembly which may be easily and quickly attached to or detached from the wheel structure, will be retained thereon securely during operation of the vehicle with which the wheel is associated and which will entirely conceal the tire rim of the wheel structure and the appurtenances associated therewith and will yet render the appurtenances readily accessible for servicing.

Still another object of the invention is to provide an improved retaining means for securing a cover assembly to a wheel structure.

Still another object of the invention is to provide for a wheel structure a cover assembly including a resiliently, locally flexible portion constructed from a suitable sheet material having the foregoing characteristics such as a synthetic plastic, rubber, either natural or synthetic, or a thin springy metal which is arranged to extend over the outer side of the wheel structure to conceal the outer surface of the flanges of the tire rim, the junction thereof with the central wheel body part and a substantial portion of the body part itself, this cover member, because of the foregoing characteristics, being susceptible of manipulation whereby it is locally, resiliently flexed outwardly away from the wheel structure to render the rear side thereof accessible for servicing the tire valve stem, wheel balancing weights, or other appurtenances which might be associated with the tire rim, and which is provided with a cross-sectional configuration of such shape and magnitude that it constitutes in effect a continuation of the side wall of a tire in the tire rim and gives the appearance of being a part thereof so as to provide an ornamental effect simulating an extremely massive tire mounted upon a central load bearing portion which is, in size, on the order of the usual bolt-on flange of the conventional wheel structure.

Still another object of the invention is to provide a multi-part cover assembly for a wheel structure including a central portion and an outer annular portion, the arrangement being such that the cover portions are secured together at their respective inner and outer peripheries and the outer portion being of flexible, resilient characteristics whereby it serves as a bumper or protecting element for the central part when the cover is removed from the wheel structure and rested on the ground.

Still another object of the invention is to provide, in conjunction with a cover assembly having the foregoing characteristics, a novel arrangement whereby the cover member may be removed from the wheel structure quickly and with great facility.

In accordance with the general features of the invention, there is provided herein for a wheel structure having a tire rim and a central load bearing portion including a bolt-on flange, a multi-part cover assembly including an outer annular portion and a central hub simulating portion, the hub simulating portion being of a size on the order of the bolt-on flange of the wheel structure and the outer annular portion having locally, flexible resilient characteristics such as those of synthetic plastic or rubber, this annular portion having a cross-sectional configuration of such shape and magnitude that it constitutes in effect a continuation of the side wall of the tire in the tire rim and extends entirely over the outer side of the tire rim radially inwardly to the vicinity of the bolt-on flange of the wheel structure where it is attached, with the hub simulating portion, to the wheel structure. Thus there is provided a cover assembly which in effect gives the appearance of an extremely massive tire and, if colored white, gives the effect of an extremely massive white side wall tire mounted upon a load bearing portion of minimum dimensions.

In accordance with other general features of the invention, there is provided herein for a wheel structure, a retaining arrangement including a plurality of resilient, cam-like clips attached to the bolt-on flange and arranged concentrically in the vicinity of the central portion of the wheel structure and a cover assembly including an outer annular part and a central circular part secured together at their respective inner and outer peripheral edges to afford a snap-on flange adapted for detachable engagement with the aforementioned resilient clips.

Other objects and advantages of the invention will become apparent from the following description and accompanying drawing in which.

Figure 1:
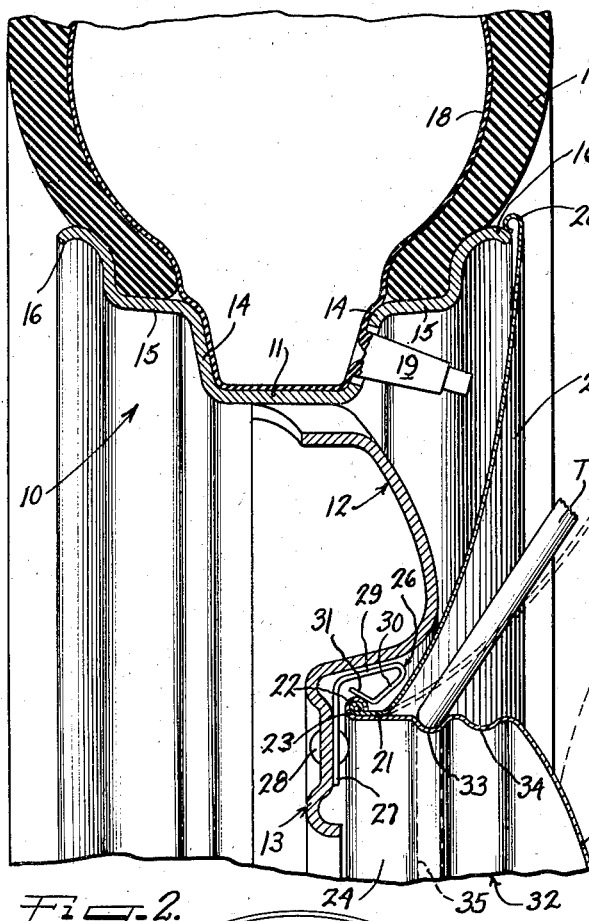
Figure 1 is a fragmentary cross-sectional view of a wheel structure including one embodiment of my invention.

As shown in Figure 1 the reference character 10 designates generally a multi-flange, drop center type of tire rim which is connected as by riveting or welding or the like through a base flange 11 to a body part or spider 12 which includes a central bolt-on flange 13. The drop center rim 10 is further provided with opposite side flanges 14, opposite intermediate flanges 15 and opposite edge portions 16. A suitable tire 17 having an inner tube 18 and a valve stem 19 is mounted upon the rim, one of the side walls 14 having an orifice through which the valve stem 19 may project.

The embodiment of the invention shown in Figure 1 includes a cover assembly comprising an outer annulus 20 and a central hub cap portion 25. The cover part 20, as indicated previously, may be constructed from synthetic plastic, rubber, either synthetic or natural, or some other substance having resilient flexible characteristics whereby it may be flexed locally away from the rim 10 as shown in dotted lines in Figure 1 to afford access to the tire valve 19 or wheel balancing weights which may be attached to the tire rim.

As is well known, appearance has become an increasingly important factor throughout the history of the automotive field and at the present time appearance of a vehicle is a factor having importance commensurate with that of the mechanical qualifications thereof. It has been found that in providing a vehicle having pleasing appearance that a focal point contributing largely to the overall appearance of a vehicle is the wheel assembly. As to this portion of the vehicle structure the trend has been from a tire of minimum dimensions to one of massive proportions. However, in accomplishing this appearance in the past the vehicle tire has been made increasingly large while the wheel structure including the tire rim has been made increasingly small so that the overall diameter of the wheel when in use is not enlarged. This increase in the size of the tire has been found to involve exceedingly high manufacturing costs and thus has greatly added to the ultimate cost of the vehicle to the consumer who has been found to inevitably consider the massiveness of the tire as an important factor in his choice of the vehicle purchased.

Accordingly, there is provided herein a construction which is cheap and efficient, and which contributes to the ultimate appearance of the vehicle in the same manner as would an exceedingly massive tire without necessitating the extremely high cost in manufacturing such a tire. In providing a cover assembly having the foregoing characteristics an important factor to be considered is the ready attachment and detachment of the cover to render the various parts of the wheel structure accessible for servicing when necessary.

As will be seen from Figure 1 the cover assembly includes an outer annular cover member which preferably is formed from a material giving it resiliently flexible characteristics such as synthetic plastic, rubber, either synthetic or natural, or the like. This cover portion 20, as will be seen, is provided with a cross-sectional configuration of such curvature and magnitude that its outer peripheral edge is disposed in the vicinity of the axially outer extremity of the edge portion 16 of the tire rim while the inner peripheral edge thereof is disposed over a large portion of the radially outer part of the body part 12 of the wheel structure and in the vicinity of the central bolt-on flange 13 thereof. Thus the cover member 20 is so arranged that it constitutes in effect a continuation of the side wall of the tire 17 and extends over the outer side of the tire rim 10, radially inwardly beyond the junction thereof with the body part 12 and further radially inwardly to the bolt-on flange 13, thereby giving the appearance of an extremely massive tire mounted upon the wheel structure. With a cover member so configurated it will be seen that the tire valve stem 19 is entirely concealed whereby a continuous unbroken surface is presented by the cover part 20. This construction, as indicated previously, is made feasible by the resilient flexible characteristics of the cover member whereby the latter may be flexed locally, resiliently, as shown in dotted lines in Figure 1 to admit the nozzle of an air hose for connection with the tire valve stem 19 or to permit insertion, removal or adjustment of wheel balancing weights which might be secured to the tire rim in any suitable manner.

As will also be seen from Figure 1 the inner peripheral edge of the cover member 20 is turned axially inwardly to provide a flange 21 which terminates in a peripheral bead 22 arranged to be enveloped by a peripheral bead 23 formed at the axially inner extremity of a flange 24 of a central hub simulating ornamental member 25. From the foregoing it will be seen that the flange 24 of the hub member 25 serves as a seat for the flange 21 of the cover member 20 when the latter is flexed as shown in dotted lines in Figure 1, thus preventing severe bending strains being imposed upon the relatively frangible cover member 20 at the beaded junction thereof with the cover member 25.

The cover member 25, and particularly the bead 23 thereof, is here utilized as the attachment means for the cover assembly.

As shown herein resilient retaining elements 26 each having radially inwardly extending fingers 27 may be secured to the bolt-on flange 13 as by rivets 28 which extend through the bolt-on flange and through the respective fingers 27 to maintain the attachment. It will be understood that the fingers 27 may be welded to the bolt-on flange or attached thereto in any other suitable manner. The retaining elements 26 are attached in circumferentially spaced relationship to one another around the bolt-on flange in the manner shown in Figure 1 and are, of course, aligned thereon so as to not interfere with the provision for the bolts which are utilized to secure the wheel to the vehicle. These retaining elements are further provided with substantially axially outwardly extending parts 29 each terminating in a resilient cover receiving portion which includes an obliquely disposed radially outwardly, axially outwardly, extending part 30 terminating in a cover retaining finger 31, the latter being obliquely disposed and extending radially outwardly and substantially axially inwardly.

From the foregoing it will be seen that the beaded attachment junction of the cover members 20 and 25 may be retainingly engaged on the wheel structure by axial inward movement thereof relative to the bolt-on flange 13. This retaining engagement is accomplished by the resiliency of the retaining elements 26 and also by the fact that the diameter of the circle prescribed by the radially outer extremity of the bead 23 on the hub cap cover portion 25 is greater than that of the circle prescribed by the junction of parts 30 and 31 of the retaining clip when they are in their position of rest. Under these circumstances it will be seen that axial inward movement of bead 23 against the wheel structure will cause an outward springing of the parts 30 of the retaining members about the curved junction of the parts 30 with the parts 29 thereof until the bead 23 has passed the junction of the parts 30 with the parts 31 whereupon the retaining members 26 will spring radially inwardly toward their normal position and whereby the axially outer part of the bead 23 will be held securely against the wheel structure by engagement thereof with the adjacent surface of the terminal portion 31 of the retaining members. In the construction shown in Figure 1 the cover member 20 is preferably provided with a relatively large bead 20a at the outer peripheral edge thereof, this bend being arranged to cam over the radially outer surface of the axially outer extremity of the edge portion 16 of the tire rim 10 whereby the cover member 20 is anchored at both its inner and outer peripheral parts.

A further aspect of the foregoing construction is that the inner peripheral edge of the relatively frangible cover member 20 is entirely protected by the enveloping outer peripheral margin of the cover member 25, hence the cover member 20 is not subjected to damaging forces during its association with the wheel structure.

Figure 3:
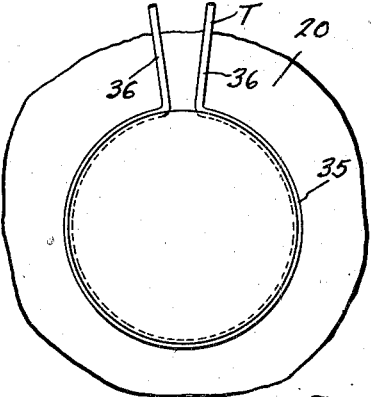
Figure 3 is a fragmentary side elevational view showing the cover removal implement and the manner of its attachment to the central hub simulating portion of the cover assembly.

To the end that the cover member 25 may be materially strengthened and to the end that easy removal of the cover assembly may be accomplished, this portion of the cover assembly is provided with a somewhat enlarged substantially axially inwardly extending flange 32 which is corrugated as at 33 and 34. As indicated, these corrugations provide substantial reinforcement for the cover assembly and furthermore provide for the attachment of a cover removing tool T which as shown in Figure 3 comprises a rod, the intermediate part 35 of which is formed in a circle while the terminal ends 36 thereof are bent radially outwardly to afford a pair of handles which, when manipulated toward or away from one another, decrease or increase the size of the circle prescribed by the intermediate portion 35. Thus it will be seen that by spreading the handles 36 the intermediate circular part of the tool T may be inserted in nested relationship with the undulation or corrugation 33 in the cover member 25, whereupon the handles 36 may be grasped by the hand and drawn toward one another to provide a tight engagement between the tool and the cover member so that outward movement of the handles 36 provides the necessary leverage for quick and easy removal of the cover assembly from the wheel structure.

Figure 4:
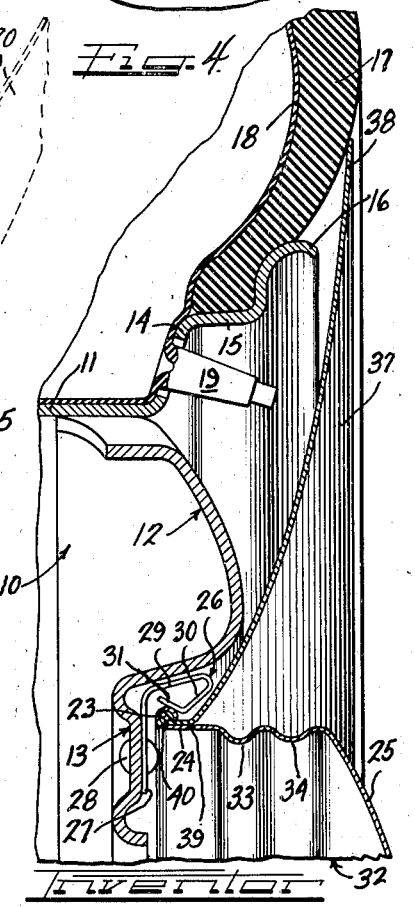
Figure 4 is a fragmentary cross-sectional view of a wheel structure embodying a modified form of my invention.
Figure 2:
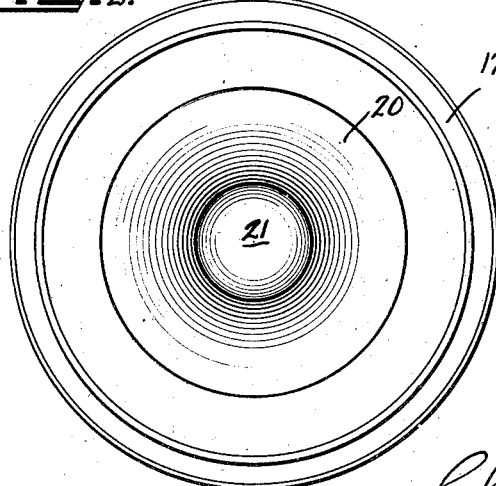
Figure 2 is a side elevational view of a completed wheel structure constructed in accordance with Figure 1.

In the construction shown in Figure 4 there is disclosed a cover assembly which is provided with a central hub simulating part 25 and an attachment arrangement similar to that of the structure shown in Figure 1. In this construction however the outer annular, resiliently flexible cover part 37 is provided with a cross-sectional configuration of such magnitude that the outer peripheral edge thereof extends entirely beyond the edge portion 16 of the tire rim 10 and the junction thereof with the side wall of the tire 17 to conceal the same and overlies the side wall of the tire so that the outer peripheral edge thereof is disposed in the vicinity of the medial plane of the tire, as shown at 38 in Figure 4.

Here again the provision of a cover assembly which entirely conceals the valve stem 19, the outer side of the tire rim 10 and any other appurtenances which may be associated therewith is feasible since the cover portion 37 is constructed with resiliently flexible characteristics so that it may be sprung substantially axially outwardly from the outer peripheral edge thereof to render the rear side thereof accessible as shown in dotted lines in Figure 1. Additionally in the construction of Figure 4 it will be seen that not only the cover member 37 is sprung outwardly to obtain access to the rear side thereof but also, since the outer peripheral edge thereof extends over the side wall of the tire 17, the cover must flex or spring locally, axially outwardly to accommodate lateral expansion of the tire 17 when a load is impressed thereon. It will be understood that the action of the tire 17 and the cover member 37 during rotation involves extremely rapid expansion of the tire and flexure of the cover member as the wheel rotates during use. It will be understood that this expansion of the tire and the return thereof to a normal condition, as shown in Figures 1 and 4, occurs periodically as each part of the wheel structure engages the ground over which the vehicle is traveling and that each part so expanding does so at a very rapid rate. This action impresses severe forces upon the cover member 37, these forces resulting in repeated axially outward flexure thereof and repeated return thereof to normal condition as shown in Figure 4. As shown by the dotted lines in Figure 1, this flexing action of the outer cover member takes place largely at the junction of the curved portion thereof with the substantially axially inwardly extending flange formed at the inner peripheral edge thereof. In Figure 4 this flange is shown at 39 and, as in the construction of Figure 1, it is arranged for surface engagement with the flange 24 of the cover member 25. Thus the flange 24 serves as a reinforcing bead for the flange 39 of the flexible cover member whereby bending stresses are directed away from the junction thereof with the bead 40 at which point breakage would be likely to occur in the cover member 37 when not so protected.

From the foregoing it will be seen that there is provided herein a cover assembly which includes an outer annular portion arranged to overlie the outer side of the wheel and thus conceal the tire rim and any appurtenance associated therewith, which extends radially inwardly over a major portion of the central body part or load bearing portion of the wheel structure and yet may be flexed either to obtain access to the rear side thereof or to accommodate lateral expansion of the tire under load bearing conditions without the severe stresses imposed thereon damaging the relatively frangible, flexible cover member. Furthermore, there is provided herein a novel retaining arrangement for securing a multi-part cover assembly to the wheel structure by association with the bolt-on flange thereof.

What I claim is:

1. In a cover assembly for a wheel structure having a tire rim and a central load bearing portion, the improvement which includes an outer annular, resiliently flexible cover member and a relatively rigid central circular cover member, said outer cover member having a cross-sectional configuration of such shape and magnitude that it extends over and conceals the outer side of the tire rim and extends radially inwardly toward the central part of the load bearing portion of the wheel structure to constitute in effect a continuation of the side wall of a tire in said tire rim to give the appearance of being a part thereof and to give the wheel structure the appearance of having a massive tire mounted thereon, said central circular cover member having a substantially axially inwardly extending flange terminating in a bead arranged to envelop the inner peripheral edge of the outer annular cover member and means at the central part of the wheel structure arranged to retainingly engage the bead on said central circular cover member to detachably secure the same to the wheel structure.

2. In a cover assembly for disposition over the outer side of a wheel structure having a tire rim and a central load bearing portion, an outer annular resiliently flexible locally, distortable cover portion and a relatively rigid central hub simulating portion, said cover portions each being provided with substantially axially inwardly extending flanges arranged for surface to surface engagement when the cover parts are disposed in assembled relationship, means on said wheel structure for detachably securing the cover assembly thereto, said flange on the hub cap portion affording reinforcement for the annular cover portion during flexure thereof substantially axially outward from the wheel structure.

3. In a cover assembly for disposition over the outer side of a wheel structure including a tire rim and a central body portion, an outer annular resiliently flexible cover portion and a central hub cap simulating portion, said outer annular portion having a cross-sectional expanse so that the outer periphery thereof is disposed in the vicinity of the edge portion of the tire rim and the inner peripheral part thereof extends radially inwardly to the central hub cap portion, said outer annular portion having a substantially axially inwardly extending flange at the inner peripheral part thereof and said hub cap portion having a substantially axially inwardly extending flange thereon, said flange on said annular cover portion being arranged to lie in surface engagement with the radially outer surface of the flange on the hub cap portion whereby the flange on the hub cap portion supports the flange of the annular portion, said annular portion being arranged to be flexed axially outwardly from the wheel structure over which it is disposed by manipulation of the outer peripheral edge thereof and being arranged to flex at a part comprising the junction between the flange thereon and the wheel covering portion thereof.

GEORGE ALBERT LYON.